(12) United States Patent
Bland et al.

(10) Patent No.: US 7,752,230 B2
(45) Date of Patent: Jul. 6, 2010

(54) DATA EXTENSIBILITY USING EXTERNAL DATABASE TABLES

(75) Inventors: M. Alan Bland, Boulder, CO (US); Stephan Edward Friedl, Frederick, CO (US); Terry Don Jennings, Westminster, CO (US); Jeffery James Olson, Boulder, CO (US); Barbara Jo West, Boulder, CO (US)

(73) Assignee: Avaya Inc., Basking Rigge, NJ (US)

( * ) Notice: Subject to any disclaimer, the term of this patent is extended or adjusted under 35 U.S.C. 154(b) by 487 days.

(21) Appl. No.: 11/246,789

(22) Filed: Oct. 6, 2005

(65) Prior Publication Data
US 2007/0083572 A1 Apr. 12, 2007

(51) Int. Cl.
*G06F 17/30* (2006.01)
(52) U.S. Cl. .................. 707/802; 707/709; 707/803
(58) Field of Classification Search ............. 707/204, 707/100, 102, 103 R, 790, 802, 803
See application file for complete search history.

(56) References Cited

U.S. PATENT DOCUMENTS

| | | | |
|---|---|---|---|
| 4,163,124 A | 7/1979 | Jolissaint | |
| 4,510,351 A | 4/1985 | Costello et al. | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,981 A | 11/1992 | Mitchell et al. | |
| 5,164,983 A | 11/1992 | Brown et al. | |
| 5,167,010 A | 11/1992 | Elm et al. | |

(Continued)

FOREIGN PATENT DOCUMENTS

CA 2143198 1/1995

(Continued)

OTHER PUBLICATIONS

U.S. Appl. No. 10/683,039, filed Oct. 10, 2003, Flockhart et al.

(Continued)

*Primary Examiner*—Mohammad Ali
*Assistant Examiner*—Thuy (Tiffany) Bui
(74) *Attorney, Agent, or Firm*—Sheridan Ross P.C.

(57) ABSTRACT

In one embodiment, a data processing system includes a first database 304 maintained by a first party (such as a customer); a second database 324, 328 maintained by a second party (such as a vendor) different from the first party; a work queue 316 to specify data to be added to the second database; an extract, transform and load module 308 to write data from the first database to the work queue; and a data import module operable 320 to import data from the work queue to the second database. In the system, the first party is not privileged to write the data directly to the second database but is privileged to write the data to the work queue. The import module transforms the data written to the work queue to a form semantically compatible with the second database.

20 Claims, 5 Drawing Sheets

U.S. PATENT DOCUMENTS

| | | |
|---|---|---|
| 5,185,780 A | 2/1993 | Leggett |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,784,452 A | 7/1998 | Carney |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | McNerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Schlueter et al. |
| 6,259,969 B1 | 7/2001 | Tackett et al. |

| | | | | | | |
|---|---|---|---|---|---|---|
| 6,263,359 B1 | 7/2001 | Fong et al. | | 6,829,348 B1 | 12/2004 | Schroeder et al. |
| 6,272,544 B1 | 8/2001 | Mullen | | 6,839,735 B2 | 1/2005 | Wong et al. |
| 6,275,806 B1 | 8/2001 | Pertrushin | | 6,842,503 B1 | 1/2005 | Wildfeuer |
| 6,275,812 B1 | 8/2001 | Haq et al. | | 6,847,973 B2 | 1/2005 | Griffin et al. |
| 6,275,991 B1 | 8/2001 | Erlin | | 6,898,190 B2 | 5/2005 | Shtivelman et al. |
| 6,278,777 B1 | 8/2001 | Morley et al. | | 6,915,305 B2 | 7/2005 | Subramanian et al. |
| 6,292,550 B1 | 9/2001 | Burritt | | 6,947,543 B2 | 9/2005 | Alvarado et al. |
| 6,295,353 B1 | 9/2001 | Flockhart et al. | | 6,947,988 B1 | 9/2005 | Saleh |
| 6,298,062 B1 | 10/2001 | Gardell et al. | | 6,968,052 B2 | 11/2005 | Wullert, II |
| 6,307,931 B1 | 10/2001 | Vaudreuil | | 6,981,061 B1 * | 12/2005 | Sakakura .................. 709/248 |
| 6,324,282 B1 | 11/2001 | McIllwaine et al. | | 6,985,901 B1 | 1/2006 | Sachse et al. |
| 6,332,081 B1 | 12/2001 | Do | | 6,988,126 B2 | 1/2006 | Wilcock et al. |
| 6,339,754 B1 | 1/2002 | Flanagan et al. | | 7,010,542 B2 | 3/2006 | Trappen et al. |
| 6,353,810 B1 | 3/2002 | Pertrushin | | 7,020,254 B2 | 3/2006 | Phillips |
| 6,356,632 B1 | 3/2002 | Foster et al. | | 7,035,808 B1 | 4/2006 | Ford |
| 6,360,222 B1 | 3/2002 | Quinn | | 7,035,927 B2 | 4/2006 | Flockhart et al. |
| 6,366,666 B2 | 4/2002 | Bengtson et al. | | 7,039,176 B2 | 5/2006 | Borodow et al. |
| 6,366,668 B1 | 4/2002 | Borst et al. | | 7,062,031 B2 | 6/2006 | Becerra et al. |
| 6,389,028 B1 | 5/2002 | Bondarenko et al. | | 7,076,051 B2 | 7/2006 | Brown et al. |
| 6,389,132 B1 | 5/2002 | Price et al. | | 7,100,200 B2 | 8/2006 | Pope et al. |
| 6,389,400 B1 | 5/2002 | Bushey et al. | | 7,110,525 B1 | 9/2006 | Heller et al. |
| 6,411,682 B1 | 6/2002 | Fuller et al. | | 7,117,193 B1 * | 10/2006 | Basko et al. .................... 707/1 |
| 6,424,709 B1 | 7/2002 | Doyle et al. | | 7,136,873 B2 | 11/2006 | Smith et al. |
| 6,426,950 B1 | 7/2002 | Mistry | | 7,149,733 B2 | 12/2006 | Lin et al. |
| 6,427,137 B2 | 7/2002 | Petrushin | | 7,155,612 B2 * | 12/2006 | Licis ......................... 713/182 |
| 6,430,282 B1 | 8/2002 | Bannister et al. | | 7,158,628 B2 | 1/2007 | McConnell et al. |
| 6,434,230 B1 | 8/2002 | Gabriel | | 7,162,469 B2 | 1/2007 | Anonsen et al. |
| 6,446,092 B1 | 9/2002 | Sutter | | 7,165,075 B2 | 1/2007 | Harter et al. |
| 6,449,356 B1 | 9/2002 | Dezonno | | 7,170,976 B1 | 1/2007 | Keagy |
| 6,449,358 B1 | 9/2002 | Anisimov et al. | | 7,170,992 B2 | 1/2007 | Knott et al. |
| 6,449,646 B1 | 9/2002 | Sikora et al. | | 7,177,401 B2 | 2/2007 | Mundra et al. |
| 6,453,038 B1 | 9/2002 | McFarlane et al. | | 7,200,219 B1 | 4/2007 | Edwards et al. |
| 6,463,148 B1 | 10/2002 | Brady | | 7,203,655 B2 | 4/2007 | Herbert et al. |
| 6,463,346 B1 | 10/2002 | Flockhart et al. | | 7,212,625 B1 | 5/2007 | McKenna et al. |
| 6,463,415 B2 | 10/2002 | St. John | | 7,215,744 B2 | 5/2007 | Scherer |
| 6,463,471 B1 | 10/2002 | Dreke et al. | | 7,222,075 B2 | 5/2007 | Petrushin |
| 6,480,826 B2 | 11/2002 | Pertrushin | | 7,246,371 B2 | 7/2007 | Diacakis et al. |
| 6,490,350 B2 | 12/2002 | McDuff et al. | | 7,257,597 B1 | 8/2007 | Pryce et al. |
| 6,535,600 B1 | 3/2003 | Fisher et al. | | 7,266,508 B1 | 9/2007 | Owen et al. |
| 6,535,601 B1 | 3/2003 | Flockhart et al. | | 7,283,805 B2 | 10/2007 | Agrawal |
| 6,553,114 B1 | 4/2003 | Fisher et al. | | 7,295,669 B1 | 11/2007 | Denton et al. |
| 6,556,974 B1 | 4/2003 | D'Alessandro | | 7,299,259 B2 | 11/2007 | Petrovykh |
| 6,560,330 B2 | 5/2003 | Gabriel | | 7,324,954 B2 | 1/2008 | Calderaro et al. |
| 6,560,649 B1 | 5/2003 | Mullen et al. | | 7,340,408 B1 | 3/2008 | Drew et al. |
| 6,560,707 B2 | 5/2003 | Curtis et al. | | 7,376,127 B2 | 5/2008 | Hepworth et al. |
| 6,563,920 B1 | 5/2003 | Flockhart et al. | | 7,392,402 B2 * | 6/2008 | Suzuki ....................... 713/193 |
| 6,571,285 B1 | 5/2003 | Groath et al. | | 7,409,423 B2 | 8/2008 | Horvitz et al. |
| 6,574,599 B1 | 6/2003 | Lim et al. | | 7,418,093 B2 | 8/2008 | Knott et al. |
| 6,574,605 B1 | 6/2003 | Sanders et al. | | 7,545,925 B2 | 6/2009 | Williams |
| 6,597,685 B2 | 7/2003 | Miloslavsky et al. | | 7,567,653 B1 | 7/2009 | Michaelis |
| 6,603,854 B1 | 8/2003 | Judkins et al. | | 2001/0011228 A1 | 8/2001 | Shenkman |
| 6,604,084 B1 | 8/2003 | Powers et al. | | 2001/0056349 A1 | 12/2001 | St. John |
| 6,614,903 B1 | 9/2003 | Flockhart et al. | | 2002/0002464 A1 | 1/2002 | Pertrushin |
| 6,650,748 B1 | 11/2003 | Edwards et al. | | 2002/0010587 A1 | 1/2002 | Pertrushin |
| 6,668,167 B2 | 12/2003 | McDowell et al. | | 2002/0112186 A1 | 1/2002 | Nakamura et al. |
| 6,675,168 B2 | 1/2004 | Shapiro et al. | | 2002/0019829 A1 | 2/2002 | Shapiro |
| 6,697,457 B2 | 2/2004 | Pertrushin | | 2002/0021307 A1 | 2/2002 | Glenn et al. |
| 6,700,967 B2 | 3/2004 | Kleinoder et al. | | 2002/0035605 A1 | 3/2002 | McDowell et al. |
| 6,704,409 B1 | 3/2004 | Dilip et al. | | 2002/0038422 A1 | 3/2002 | Suwamoto et al. |
| 6,707,903 B2 | 3/2004 | Burok et al. | | 2002/0065894 A1 | 5/2002 | Dalal et al. |
| 6,711,253 B1 | 3/2004 | Prabhaker | | 2002/0076010 A1 | 6/2002 | Sahai |
| 6,735,299 B2 | 5/2004 | Krimstock et al. | | 2002/0085701 A1 | 7/2002 | Parsons et al. |
| 6,735,593 B1 | 5/2004 | Williams | | 2002/0087630 A1 | 7/2002 | Wu |
| 6,738,462 B1 | 5/2004 | Brunson | | 2002/0116336 A1 | 8/2002 | Diacakis et al. |
| 6,744,877 B1 | 6/2004 | Edwards | | 2002/0116461 A1 | 8/2002 | Diacakis et al. |
| 6,754,333 B1 | 6/2004 | Flockhart et al. | | 2002/0123923 A1 | 9/2002 | Manganaris et al. |
| 6,757,362 B1 | 6/2004 | Cooper et al. | | 2003/0028621 A1 | 2/2003 | Furlong et al. |
| 6,766,013 B2 | 7/2004 | Flockhart et al. | | 2003/0073440 A1 | 4/2003 | Mukherjee et al. |
| 6,766,014 B2 | 7/2004 | Flockhart et al. | | 2003/0093465 A1 | 5/2003 | Banerjee et al. |
| 6,766,326 B1 | 7/2004 | Cena | | 2003/0108186 A1 | 6/2003 | Brown et al. |
| 6,775,377 B2 | 8/2004 | Mcillwaine et al. | | 2003/0144900 A1 | 7/2003 | Whitmer |
| 6,785,666 B1 * | 8/2004 | Nareddy et al. ................ 707/1 | | 2003/0144959 A1 | 7/2003 | Makita |
| 6,822,945 B2 | 11/2004 | Petrovykh | | 2003/0174830 A1 | 9/2003 | Boyer et al. |

| | | | |
|---|---|---|---|
| 2003/0177017 A1 | 9/2003 | Boyer et al. | |
| 2003/0231757 A1 | 12/2003 | Harkreader et al. | |
| 2004/0008828 A1 | 1/2004 | Coles et al. | |
| 2004/0015496 A1 | 1/2004 | Anonsen | |
| 2004/0015506 A1 | 1/2004 | Anonsen et al. | |
| 2004/0054743 A1 | 3/2004 | McPartlan et al. | |
| 2004/0057569 A1 | 3/2004 | Busey et al. | |
| 2004/0103324 A1 | 5/2004 | Band | |
| 2004/0138944 A1 | 7/2004 | Whitacre et al. | |
| 2004/0162998 A1 | 8/2004 | Tuomi et al. | |
| 2004/0202309 A1 | 10/2004 | Baggenstoss et al. | |
| 2004/0203878 A1 | 10/2004 | Thomson | |
| 2004/0210475 A1 | 10/2004 | Starnes et al. | |
| 2004/0240659 A1 | 12/2004 | Gagle et al. | |
| 2004/0249650 A1 | 12/2004 | Freedman et al. | |
| 2004/0260706 A1 | 12/2004 | Anonsen et al. | |
| 2005/0021529 A1 | 1/2005 | Hodson et al. | |
| 2005/0027612 A1 | 2/2005 | Walker et al. | |
| 2005/0044375 A1* | 2/2005 | Paatero et al. | 713/176 |
| 2005/0071211 A1 | 3/2005 | Flockhart et al. | |
| 2005/0071212 A1 | 3/2005 | Flockhart et al. | |
| 2005/0071241 A1 | 3/2005 | Flockhart et al. | |
| 2005/0071844 A1 | 3/2005 | Flockhart et al. | |
| 2005/0091071 A1 | 4/2005 | Lee | |
| 2005/0125432 A1 | 6/2005 | Lin et al. | |
| 2005/0125458 A1* | 6/2005 | Sutherland et al. | 707/201 |
| 2005/0138064 A1 | 6/2005 | Trappen et al. | |
| 2005/0154708 A1 | 7/2005 | Sun | |
| 2005/0182784 A1 | 8/2005 | Trappen et al. | |
| 2005/0289446 A1 | 12/2005 | Moncsko et al. | |
| 2006/0004686 A1 | 1/2006 | Molnar et al. | |
| 2006/0007916 A1 | 1/2006 | Jones et al. | |
| 2006/0015388 A1 | 1/2006 | Flockhart et al. | |
| 2006/0026049 A1 | 2/2006 | Joseph et al. | |
| 2006/0056598 A1 | 3/2006 | Brandt et al. | |
| 2006/0135058 A1 | 6/2006 | Karabinis | |
| 2006/0178994 A1* | 8/2006 | Stolfo et al. | 705/50 |
| 2006/0242160 A1* | 10/2006 | Kanchwalla et al. | 707/100 |
| 2006/0256957 A1 | 11/2006 | Fain et al. | |
| 2006/0271418 A1 | 11/2006 | Hackbarth et al. | |
| 2007/0038632 A1 | 2/2007 | Engstrom | |
| 2007/0064912 A1 | 3/2007 | Kagan et al. | |
| 2007/0112953 A1 | 5/2007 | Barnett | |
| 2007/0127643 A1 | 6/2007 | Keagy | |
| 2007/0192414 A1 | 8/2007 | Chen et al. | |
| 2007/0201311 A1 | 8/2007 | Olson | |
| 2007/0201674 A1 | 8/2007 | Annadata et al. | |
| 2007/0230681 A1 | 10/2007 | Boyer et al. | |
| 2008/0056165 A1 | 3/2008 | Petrovykh | |
| 2009/0193050 A1 | 7/2009 | Olson | |

FOREIGN PATENT DOCUMENTS

| | | |
|---|---|---|
| CA | 2174762 | 3/1996 |
| EP | 0501189 | 9/1992 |
| EP | 0740450 | 10/1996 |
| EP | 0770967 | 5/1997 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 0899673 | 3/1999 |
| EP | 0998108 | 5/2000 |
| EP | 1035718 | 9/2000 |
| EP | 1091307 | 4/2001 |
| EP | 1150236 | 10/2001 |
| GB | 2273418 | 6/1994 |
| GB | 2290192 | 12/1995 |
| JP | 2001-053843 | 2/2001 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 01/80094 | 10/2001 |
| WO | WO 02/099640 | 12/2002 |

OTHER PUBLICATIONS

U.S. Appl. No. 10/861,193, filed Jun. 3, 2004, Flockhart et al.
U.S. Appl. No. 10/946,638, filed Sep. 20, 2004, Flockhart et al.
U.S. Appl. No. 10/815,534, filed Mar. 31, 2004, Kiefhaber.
U.S. Appl. No. 10/815,566, filed Mar. 31, 2004, Kiefhaber.
U.S. Appl. No. 10/815,584, filed Mar. 31, 2004, Kiefhaber.
Kimball, et al., "The Complete Guide to Dimensional Modeling." The Data Warehouse Toolkit. 2nd Edition, 2002. Ch. 11, pp. 240-241.
Kimball, et al., "Practical Techniques for Extracting, Cleaning, Conforming, and Delivering Data." The Data Warehouse ETL Toolkit. 2004. Ch. 5, pp. 170-174.
Snape, James, "Time Dimension and Time Zones." 2004. pp. 1-10. http://www.jamessnape.me.uk/blog/CommentView,gui,79e910a1-0150-4452-bda3-e98df.
DEFINITY Communications System Generic 3 Call Vectoring-Expert Agent Selection (EAS) Guide, AT&T publication No. 555-230-520 (Issue 3, Nov. 1993).
S. Ahmed, "A Scalable Byzantine Fault Tolerant Secure Domain Name System," thesis submitted to MIT Dept of Electrical Engineering and Computer Science, Jan. 22, 2001, 101 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
D-H Kim et al. "Collaborative Multimedia Middleware Architecture and Advanced Internet Call Center," Internt'l Conference on Information Networking, Jan. 31, 2001, pp. 246-250.
Foster, Robin, et al., "Avaya Business Advocate and its Relationship to Multi-Site Load Balancing Applications," Avaya, Inc., Mar. 2002, 14 pages.
US 6,537,685, Mar. 2003, Fisher et al. (withdrawn).
U.S. Appl. No. 11/087,290, filed Mar. 22, 2005, Michaelis.
U.S. Appl. No. 11/199,828, filed Aug. 8, 2005, Bland et al.
U.S. Appl. No. 11/245,724, filed Oct. 6, 2005, Flockhart et al.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick.
U.S. Appl. No. 12/242,916, filed Oct. 1, 2008, Kiefhaber et al.
U.S. Appl. No. 12/193,542, filed Aug. 18, 2008, Olson.
"Avaya IQ—Building Upon the Strengths of CMS", White Paper, Feb. 2007, 11 pages.
"Dimensional database", Wikipedia, downloaded Aug. 30, 2007 (3 pages).
"Driving Model Agent Behaviors With Avaya IQ", White Paper, Apr. 2007, 12 pages.
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages.
Avaya IQ "Introducing Reporting And Analytics As You Designed It", 2007, 4 pages.
Creating and Using Data Warehouse Dimension Tables (Microsoft) copyright 2005, http://msdn.microsoft.com/library/en-us/createdw/createdw_10kz.asp?frame=true, 3 pages.
D. Smith, "Data Model Overview Modeling for the Enterprise While Serving the Individual", Teredata Global Sales Support, 2007, 33 pages.
E. Veerman, "Designing A Dimensional Model", date unknown, 38 pages.
G. Hellstrom et al., "RFC 2793—RTP Payload for Text Conversation," Network Working Group Request for Comments 2793 (May 2000), available at http://www.faqs.org/rfcs.rfc2793.html, 8 pages.
G. Wiederhold, "Mediation to Deal with Heterogeneous Data Sources", Stanford University, Jan. 1999, 19 pages.
H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.

J. Cahoon, "Fast Development of a Data Warehouse Using MOF, CWM and Code Generation", CubeModel, May 22, 2006, 32 pages.

J.E. Bentley, "Metadata: Everyone Talks About It, But What Is It?", First Union National Bank, date unknown, 5 pages.

L. Cabibbo et al., "An Architecture For Data Warehousing Supporting Data Independence And Interoperability", International Journal of Cooperative Information Systems, Nov. 2004, 41 pages.

O. Boussaid et al., "Integration and dimensional modeling approaches for complex data warehousing", J. Global Optimization, vol. 37, No. 4, Apr. 2007, 2 pages.

Intelligent Enterprise Magazine—Data Warehouse Designer: Fact Tables and Dimension, downloaded May 18, 2005, http://www.intelligententerprise.com/030101/602warehouse1_1.jhtml, 7 pages.

Aspect—"Analysis and Reporting," http://aspect.com/products/analysis/index.cfm, (Copyright 2005) (1 page).

Aspect—"Call Center Reports," http://aspect.com/products/analysis/ccreporting.cfm, (Copyright 2005) (2 pages).

Aspect—"Performance Optimization," http://aspect.com/products/wfm/performanceopt.cfm?section=performanceopt, (Copyright 2005) (1page).

Avaya—"Avaya and Blue Pumpkin—Providing Workforce Optimization Solutions" (Copyright 2004) (3 pages).

Avaya—"Avaya and Texas Digital Systems—Providing Real-time Access to Call Statistics" (Copyright 2004) (3 pages).

Avaya—"Avaya Basic Call Management System Reporting Desktop" (Copyright 2002) (4 pages).

Avaya—"Avaya Call Management System" (Copyright 2003) (3 pages).

Avaya—"Basic Call Management System Reporting Desktop," Product Description, http://www.avaya.com/gcm/master-usa/en-us/products/offers/bcmrs_desktop.htm (Copyright 2005) (2 pages).

Avaya—"Basic Call Management System Reporting Desktop," Product Features, http://www.avaya.com/gcm/master-usa/en-us/products/offers/bcmrs_desktop.htm (Copyright 2005) (2 pages).

Avaya—"Basic Call Management System Reporting Desktop," Product Overview, http://www.avaya.com/gcm/master-usa/en-us/products/offers/bcmrs_desktop.htm (Copyright 2005) (2 pages).

Avaya—"Basic Call Management System Reporting Desktop," Product Technical, http://www.avaya.com/gcm/master-usa/en-us/products/offers/bcmrs_desktop.htm (Copyright 2005) (2 pages).

Avaya—"Call Management System," Product Description, http://www.avaya.com/gcm/master-usa/en-us/products/offers/call_management_system.htm (Copyright 2005) (2 pages).

Avaya—"Call Management System," Product Features, http://www.avaya.com/gcm/master-usa/en-us/products/offers/call_management_system.htm (Copyright 2005) (3 pages).

Avaya—"Call Management System," Product Overview, http://www.avaya.com/gcm/master-usa/en-us/products/offers/call_management_system.htm (Copyright 2005) (2 pages).

Avaya—"Call Management System," Product Technical, http://www.avaya.com/gcm/master-usa/en-us/products/offers/call_management_system.htm (Copyright 2005) (2 pages).

Avaya—"Multi Channel Product Authorization," (PA) Version 5.0, (Nov. 2003) (6 pages).

Cherry, "Anger Management," IEEE Spectrum (Apr. 2005) (1 page).

NICE Systems—"Insight from Interactions," "Overwhelmed by the Amount of Data at your Contact Center?" http://www.nice.com/products/multimedia/analyzer.php, (Printed May 19, 2005) (2 pages).

NICE Systems—"Multimedia Interaction Products," "Insight from Interactions," http://www.nice.com/products/multimedia/contact_centers.php (Printed May 19, 2005) (3 pages).

Nortel—"Centrex Internet Enabled Call Centers," http://www.products.nortel.com/go/product_assoc.jsp?segId=0&parID=0&catID=-9191&rend_id... (Copyright 1999-2005) (1page).

"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.

"KANA—Contact Center Support", available at http://www.kana.com/solutions.php?tid=46, copyright 2006, 3 pages.

"Monitoring: OneSight Call Statistics Monitors", available at http://www.empirix.com/default.asp?action=article&Id=301, date unknown, printed May 10, 2007, 2 pages.

"Oracle and Siebel" Oracle, available at http://www.oracle.com/siebel/index.html, date unknown, printed May 10, 2007, 2 pages.

Microsoft Office Animated Help Tool, date unknown, 1 page.

"Still Leaving It To Fate?: Optimizing Workforce Management", Durr, William Jr., Nov. 2001.

"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).

"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.

Andy Zmolek; "SIMPLE and Presence: Enterprise Value Propositions," Avaya presentation, 16 pages, presented Jan. 24, 2002.

Berners-Lee et al.; "Uniform Resource Identifiers (URI); Generic Syntax," Network Working Group, Request for Comments 2396 (Aug. 1998), 38 pages.

Dawson et al.; "Vcard MIME Directory Profile," Network Working Group (Sep. 1998), available at http://www.ietf.org/rfc/rfc2426.txt?number=2426, 40 pages.

Fielding et al.; "Hypertext Transfer Protocol—HTTP/1.1," Network Working Group, Request for Comments 2068 (Jan. 1997), 152 pages.

G. Klyne; "A Syntax for Describing Media Feature Sets," Network Working Group (Mar. 1999), available at http://www.ietf.org/rfc/rfc2533.txt?number=2533, 35 pages.

G. Klyne; "Protocol-independent Content Negotiation Framework," Network Working Group (Sep. 1999), available at http://www.ietf.org/rfc/rfc2703.txt?number=2703, 19 pages.

Holtman et al.; "HTTP Remote Variant Selection Algorithm—RVSA/1.0," Network Working Group (Mar. 1998), available at http://www.ietf.org/rfc/rfc2296.txt?number=2296, 13 pages.

Holtman et al.; "Transparent Content Negotiation in HTTP," Network Working Group (Mar. 1998), available at http://www.ietf.org/rfc/rfc2295.txt?number=2295, 55 pages.

Sarda, "Temporal Issues in Data Warehouse Systems", 1999, Database Applications in Non-Traditional Environments (DANTE'99), S. 27, DOI: 10.1109/DANTE.1999.844938.

Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.

"Learn the structure of an Access database", available at http://office.microsoft.com/en-us/access/HA012139541033.aspx, site updated Nov. 13, 2007, pp. 1-4.

Dillion, "Renaming fields and tracing dependencies", available at http://allenbrowne.com/ser-41.html, Nov. 2003, updated May 2006, 1 page.

Thayer Watkins, "Cost Benefit Analysis", 1999, San Jose State University Economics Department, Web Archive http://web.arch ive.org/web/19990225143131/http://www.sjsu.edu/faculty/watkins/cba.htm.

Background of the Invention for the above-captioned application (previously provided).

Translation of First Office Action for Chinese Patent Application No. 200610139560.0, mailed Jul. 11, 2008.

First Office Action for German Patent Application No. 10 2006 047 499.6-53, mailed Aug. 12, 2008.

Search Report for UK Patent Application No. GB0619051.6, mailed Jan. 29, 2007.

Examination Report for UK Patent Application No. GB0619051.6, mailed Jun. 16, 2008.

Search and Examination Report for UK Patent Application No. GB 0803000.9, mailed Jun. 16, 2008.

Further Examination Report for UK Patent Application No. GB0619051.6, mailed May 14, 2009.

Further Examination Report for UK Patent Application No. GB 0803000.9, mailed May 15, 2009.

U.S. Appl. No. 11/242,687, filed Oct. 3, 2005, Krimstock et al.

Translation of Appeal Examiner's Office Letter for Japanese Patent Application No. 2006-274656, mailed Aug. 24, 2009.

Examination Report under Section 18(3) for UK Patent Application No. GB 0803000.9, mailed Oct. 5, 2009.

Examination Report under Section 18(3) for UK Patent Application No. GB0619051.6, mailed Oct. 5, 2009.

Fundamentals of Data Warehousing—Unit 3—Dimensional Modeling, Fundamentals of Data Warehousing, copyright 2005—Evolve Computer Solutions, 55 pages.

The Importance of Data Modeling as a Foundation for Business Insight, Larissa Moss and Steve Hoberman, copyright 2004, 38 pages.

CS 345: Topics in Data Warehousing, Oct. 5, 2004, 36 pages.

An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.

Data Warehouse Designer Fact Tables and Dimension, Jan. 1, 2003, http://www.inteeigententerprise.com/030101/602warehouse1_1.jhtml, Ralph Kimball, 3 pages.

Glossary—Curlingstone Publishing, http://www.curlingstone.com/7002/7002glossary.html, downloaded May 24, 2005, 11 pages.

Data Warehouse—Surrogate Keys, Keep Control Over Record Identifiers by Generating New Keys for the Data Warehouse, Ralph Kimball, May 1998, http://www.dbmsmag.com/9805d05.html; 4 pages.

Data Warehouse Designer—An Engineer' s View—Its' Worthwhile to Remind Ourselves Why We Build Data Warehouses the Way We Do, Ralph Kimball, Jul. 26, 2002, http://www.intelligententerprise.com/020726/512warehouse1_1.jhtml?_requestid=598469, 3 pages.

Data Warehouse Designer—Design Constraints and Unavoidable Realities, No design Problem in School was This Hard, Ralph Kimball, Sep. 3, 2002, http://www.intelligentebterprise.com/020903/514warehouse1_1.jhtml?_requestid=598565, 3 pages.

Data Warehouse Designer—Two Powerful Ideas, The Foundation for Modern Data Warehousing, Ralph Kimball, Sep. 17, 2002, http://www.intelligententerprise.com/020917/515warehouse1_1.jhtml?_requestid=598601, 3 pages.

Data Warehouse Designer—Divide and Conquer, Build Your Data Warehouse One Piece at a Time, Ralph Kimball, Oct. 30, 2002, http://www.intelligententerprise.com/021030/517warehouse1_1.jhtml?_requestid=598655, 3 pages.

Data Warehouse Designer—The Soul of the Data Warehouse, Part One: Drilling Down, Ralph Kimball, Mar. 20, 2003, http://www.intelligententerprise.com/030320/605warehouse1_1.jhtml?_requestid=598699, 3 pages.

Data Warehouse Designer—The Soul of the Data Warehouse, Part Two: Drilling Across, Ralph Kimball, Apr. 5, 2003, http://www.intelligententerprise.com/030405/606warehouse1_1.jhtml?_requestid=598722, 3 pages.

Data Warehouse Designer—The Soul of the Data Warehouse, Part Three: Handling Time, Ralph Kimball, Apr. 22, 2003, http://www.intelligententerprise.com/030422/607warehouse1_1.jhtml?_requestid=598766, 3 pages.

Data Warehouse Designer—TCO Starts with the End User, Ralph Kimball, May 13, 2003, http://www.intelligententerprise.com/030513/608warehouse1_1.jhtml?_requestid=598425, 3 pages.

Creating and Using Data Warehouse—Using Dimensional Modeling (Microsoft), downloaded May 18, 2005, http://msdn.microsoft.com/library/en-us/createdw/createdw_39z.asp?frame=true, 1 page.

DMReview—Business Dimensional Modeling: The Logical Next Step: Translating the BDM, Laura Reeves, published May 2004, http://www.dmreview.com/article_sub.cfm?articleId=1002508, 4 pages.

Multi-Dimensional Modeling with BW ASAP for BW Accelerator Business Information Warehouse, A Background to the Techniques Used to Create SAP BW InfoCubes Document Version 2.0, copyright 2000, 71 pages.

ComputerWorld, ETL, M. Songini, at http://www.computerworld.com/databasetopics/businessintelligence/datawarehouse/story/... 5 pages.

* cited by examiner

DATA EXTENSIBILITY USING EXTERNAL DATABASE TABLES

FIELD OF THE INVENTION

The present invention is directed generally to event processing and specifically to monitoring agent performance.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled.

The primary objective of contact center management, including call-distribution algorithms, is to ultimately maximize contact center performance and profitability. An ongoing challenge in contact center administration is monitoring of agent behaviors to optimize the use of contact center resources and maximize agent performance and profitably. Current products for monitoring and reporting on contact center performance, such as Call Management System or CMS™ by Avaya, Inc., are configured as data warehouses that extract data from multiple sources, transform the data into a normalized form, and load the data into the data warehouse database, typically on a batch schedule. Additional calculations and reporting are performed after the batch load.

A common type of data warehouse is based on dimensional modeling. Dimensional modeling is a data model that divides the world into measurements and context. Measurements are usually numeric and taken repeatedly. Numeric measurements are facts. Facts are surrounded by textual context in existence when the fact is recorded. Context is often subdivided into dimensions. Fact tables are used in dimensional modeling to logically model measurements with multiple foreign keys referring to the contextual entities. The contextual entities each have an associated primary key. A "key" is a data element (e.g., attribute or column) that identifies an instance of an entity or record in a collection of data, such as a table. A "primary key" is a column or combination of columns whose values uniquely identify a row in a table or is the attribute or group of attributes selected from the candidate keys as the most suitable to uniquely identify each instance of an entity. A "foreign key" refers to a column or combination of columns whose values are required to match a primary key in another table or is a primary key of a parent entity that contributes to a child entity across a relationship. Types of primary keys include a natural key, or a key having a meaning to users, and a surrogate key, or a key that is artificially or synthetically established, meaningless to users, and used as a substitute for a natural key.

If the same entity (e.g., agent) is represented on multiple data sources (e.g., inbound call system and outbound call system) by different natural keys, a traditional data warehouse generates and assigns a surrogate key to identify the entity. The surrogate key is an internal identifier managed by the data warehouse. For example, in a contact center an agent may handle inbound calls from one system and outbound calls from another system, with different identities on each system. Data warehouses commonly process each data source independently, performing data correlation across sources at a later time.

Some data models specify a behavior known as a type 2 slowly changing dimension. A type 2 dimension tracks the history of changes to an entity over time. When an attribute of an entity is changed, such as when a contact center agent changes their skill set or group membership, a new surrogate key for that entity is generated, and a new row inserted into the database. Fact data associated with the entity can now be tracked separately for activities that occurred before versus after the change by referencing the appropriate surrogate key.

An ongoing issue confronting vendors of contact center software products, particularly products including dimensional modeling software, is integration of the enterprise database applications (or application software), typically purchased from other vendors, with the contact center software. The vendor of the contact center software desires ease of integration with the existing enterprise database application software but must be careful that the integration of the software does not lead to semantical inconsistencies and other conflicts that can result in reporting inaccuracies or, even worse, software malfunctions.

A number of approaches have been employed to address this issue.

In one approach, the database provides a limited ability to control the types of extensions a particular database user can make. For example, a database table owner disallows column deletion to protect existing data. The table owner may also wish to allow columns to be added to the table and can configure the database to allow a table user to add a fixed set of columns. However, if the existing columns have constraints on their values beyond the conventional relational model, there is no way to ensure that data in the new columns adheres to those constraints. For example in dimensional modeling, dimension tables with type-2 keys have particular rules about when a new key must be generated. Basically, if the value of any of the non-type-2 key columns changes, an entire new row with a new type-2 key and a complete copy of all up-to-date data are inserted to the table. This arrangement can preserve the historical information associated with the dimensional table. However, allowing an arbitrary third party to create such columns requires the third party to participate in the type-2 key semantics. Unfortunately, databases do not provide a way to guarantee the type-2 semantics. For example, the customer can undo a type-2 key change done by the contact center database software or vice versa. Moreover, this approach has also suffered from race conditions that could cause loss of updates.

In another approach, database triggers on the table are used to watch for third party changes, which, when identified, are followed by an application applying appropriate type-2 semantics. Unfortunately, such an approach frequently leads to race conditions between the application and the third party that prevent proper logical semantics from being maintained. Simply put, there is no way to control the third party's timing associated with changes to the extended column set. Often times, the application is unwilling to allow changes to a table for some reason while an Extract, Transform, and Load or ETL module is computing summaries from the table, for example.

Another approach uses transactions or "database locking" in which change requests (transactions) are delayed for a determined period of time. Database locking may help but can be difficult to use for a complete solution. For instance, if the transaction hold time is long-lived, the third party's application or the contact center application may be bogged down.

SUMMARY OF THE INVENTION

These and other needs are addressed by the various embodiments and configurations of the present invention. The present invention is directed generally to an extensible data model.

In one embodiment or the present invention, a data processing system includes:

(a) a first database maintained or managed by a first party;

(b) a second database maintained or managed by a second party different from the first party;

(c) a work queue to specify data to be added to the second database;

(d) an extract, transform and load module operable to write data from the first database to the work queue; and (e) a data import module operable to import data from the work queue to the second database.

The first party's privileges with respect to the second database are limited. For example, the first party is preferably not privileged to write (insert, delete, and/or update) the data directly to the second database or to modify (insert, delete, and/or update) the data model defining the second database. This is so because the second party is responsible for maintaining and modifying the second database, including customizing the second database to receive custom data from the first database. Typically, the first and second parties are different unrelated business entities that are not under common control and one does not have a controlling interest in the other.

To protect the proprietary schema of the second database from the first party, the second database permissions for the first party are preferably set to read-only for first party access. Preferably, the first party is prohibited from viewing selected parts of the schema. This is done by permitting access only through the database views and not the physical tables. Generally, the first party is permitted to write data directly only to work queue tables and, possibly, specified custom tables.

In a second embodiment, a method is provided that includes the steps of:

(a) receiving from the first party a set of specifications defining an extension to the second database maintained by the second party;

(b) modifying the second database as set forth in the set of specifications, the modification including a custom table, a custom row in a table, and/or a custom column in a table;

(c) creating a work queue corresponding to the modification;

(d) the work queue receiving first data from a first database;

(e) normalizing the first data to form second data; and (f) writing the second data to the custom table, custom row, and/or custom column.

The method effectively performs mapping of data from the first to the second database. The first data is semantically compatible with the first database and semantically incompatible with the second database, and the second data is semantically incompatible with the first database and semantically compatible with the second database. As used herein, "semantics" refers to the relationships of symbols, characters, or groups of symbols or characters to their meanings and/or to one another. The relationships are typically independent of the manner of their interpretation and use. Two symbols or characters are "compatible" when they may be used in a common database without first requiring semantical changes to the database to accommodate their concurrent use.

The above embodiments can allow unprivileged parties (potentially not trusted) to make extensions to a database model while providing protection for logical semantics needed by the database model. The unprivileged party knows the intricacies of the first but not the second database while the second party knows the intricacies of the second but not the first database. The above embodiments can effectively blend the knowledge of the two parties to combine the first and second databases while effectively inhibiting data conflicts, collisions, and other inconsistencies from conflicting modifications to the second database. It therefore relieves the first party from having to know and implement complicated semantics, particularly type-2 semantics, of the second database model. For example, the present invention can provide a mechanism to guarantee proper type-2 dimensional keys if the database model uses dimensional modeling.

In one configuration, the invention uses external tables (in the work queues) to protect access to the application's database tables (referred to as "protected tables"). The external tables include a "sandbox" where the enterprise can insert, delete, and update. Database triggers or similar change notification mechanism on the external table provide notification to application software that then makes appropriate changes to the corresponding protected table. The changes can include enforcement of type-2 dimension semantics for the protected table.

In another configuration, the enterprise may only insert into the external table. In this case, the triggers work as before, causing appropriate changes to take place in the protected table. Once those changes are complete, the corresponding row is deleted from the external table. In this way, the external table implements a work request queue for changes to the protected table.

The external tables may not be set up by the unprivileged party. The protected table owner may set the external tables up based on information given by the unprivileged party. For example, the information can include what protected table the external table relates to, what external table columns are, whether the columns should be created inside the protected table or as a separate protected table, etc.

In both configurations, the protected tables cannot be modified by the unprivileged party. The triggering mechanisms enforce the additional semantics (e.g., type-2 semantics) so that the protected table always maintains proper semantics. The application may suspend triggering operations during periods where the protected table undergoes processing (e.g., forming summary data from it). In that case, the unprivileged party can track which changes have occurred by examining the contents of the external table.

Other means of protecting table semantics allow access (e.g., by Structured Query Language or SQL) but require the otherwise unprivileged party to participate in the protected table semantics. The present invention, in contrast, provides the external work queues accessible to the unprivileged party using SQL but preferably uses triggers to ensure proper semantics of the protected table. The invention can thus avoid the need to protect tables using non-SQL third party access.

For the reasons noted above, the invention can provide an interface that blends or multiplexes, in real time or near real time, two different data from two different sources. One source is the enterprise data collection and processing software external to the contact center data collection and processing software and the other source is the contact center software itself.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any application in which it is desirable to provide improved event (e.g., contact) processing.

Figure 1:
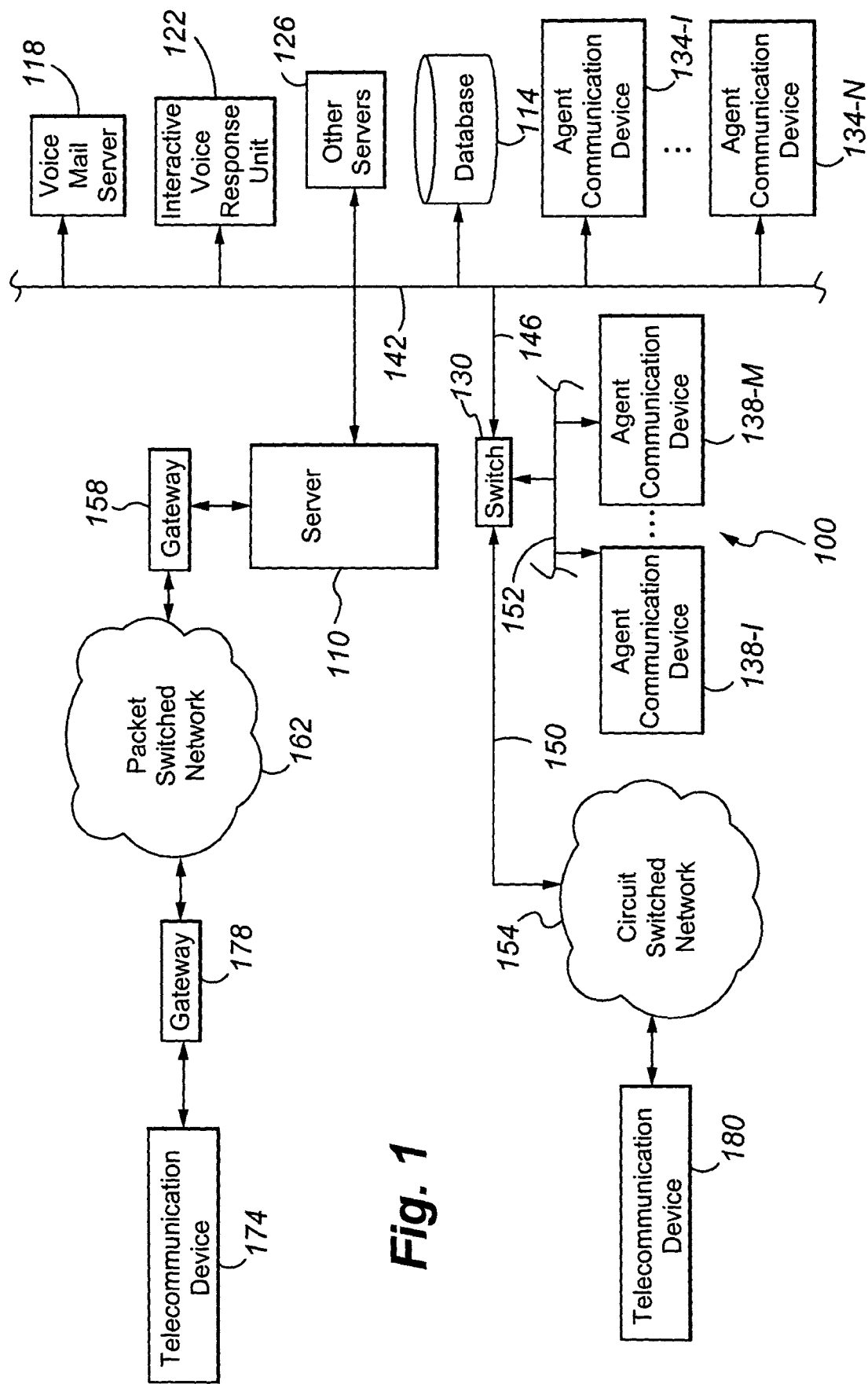
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126 (such as a predictive dialer), a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

The switch 130 and/or server 110 can be any architecture for directing contacts to one or more telecommunication devices. Illustratively, the switch and/or server can be a modified form of Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and any other communication device.

The second telecommunication devices 138-1, . . . 138-M are circuit-switched and can include, for example, wired and wireless telephones, PDAs, H.320 video phones and conferencing units, voice messaging and response units, traditional computer telephony adjuncts, and any other communication device.

The packet-switched network 162 can be any data and/or distributed processing network, such as the Internet.

The packet-switched network 162 is in communication with an external first telecommunication device 174 via a gateway 178, and the circuit-switched network 154 with an external second telecommunication device 180.

It should be emphasized that the configuration of the switch, server, user telecommunication devices, and other elements as shown in FIG. 1 is for purposes of illustration only and should not be construed as limiting the invention to any particular arrangement of elements.

Figure 2:
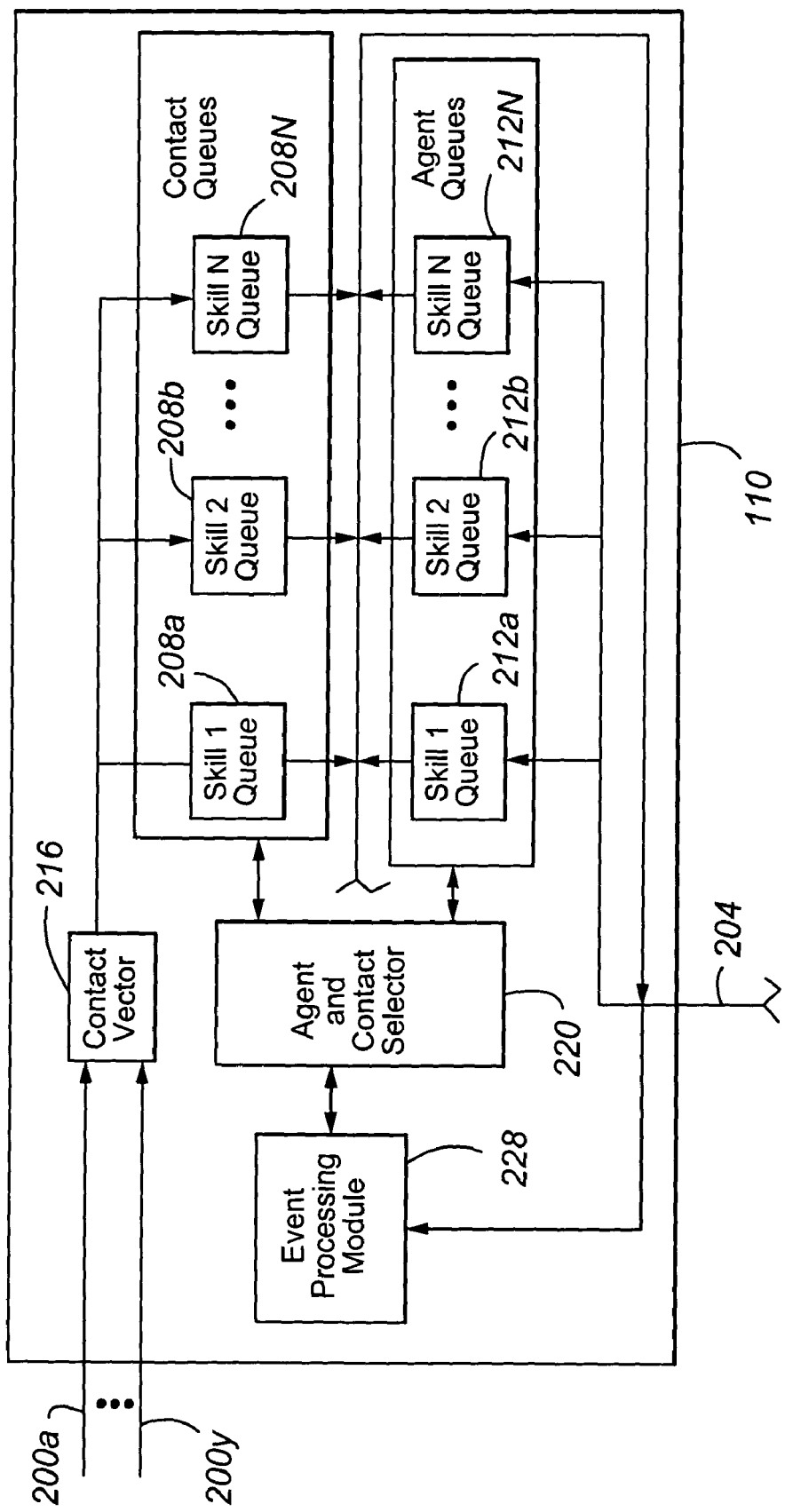
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include an event processing module 228, such as a modified form of Basic Call Management System™ or BCMS, Call Management System™, and/or Operational Analyst™ by Avaya, Inc., that gathers call records and contact-center statistics for use in generating contact-center reports.

Included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills and/or skill levels that they possess.

Figure 3:
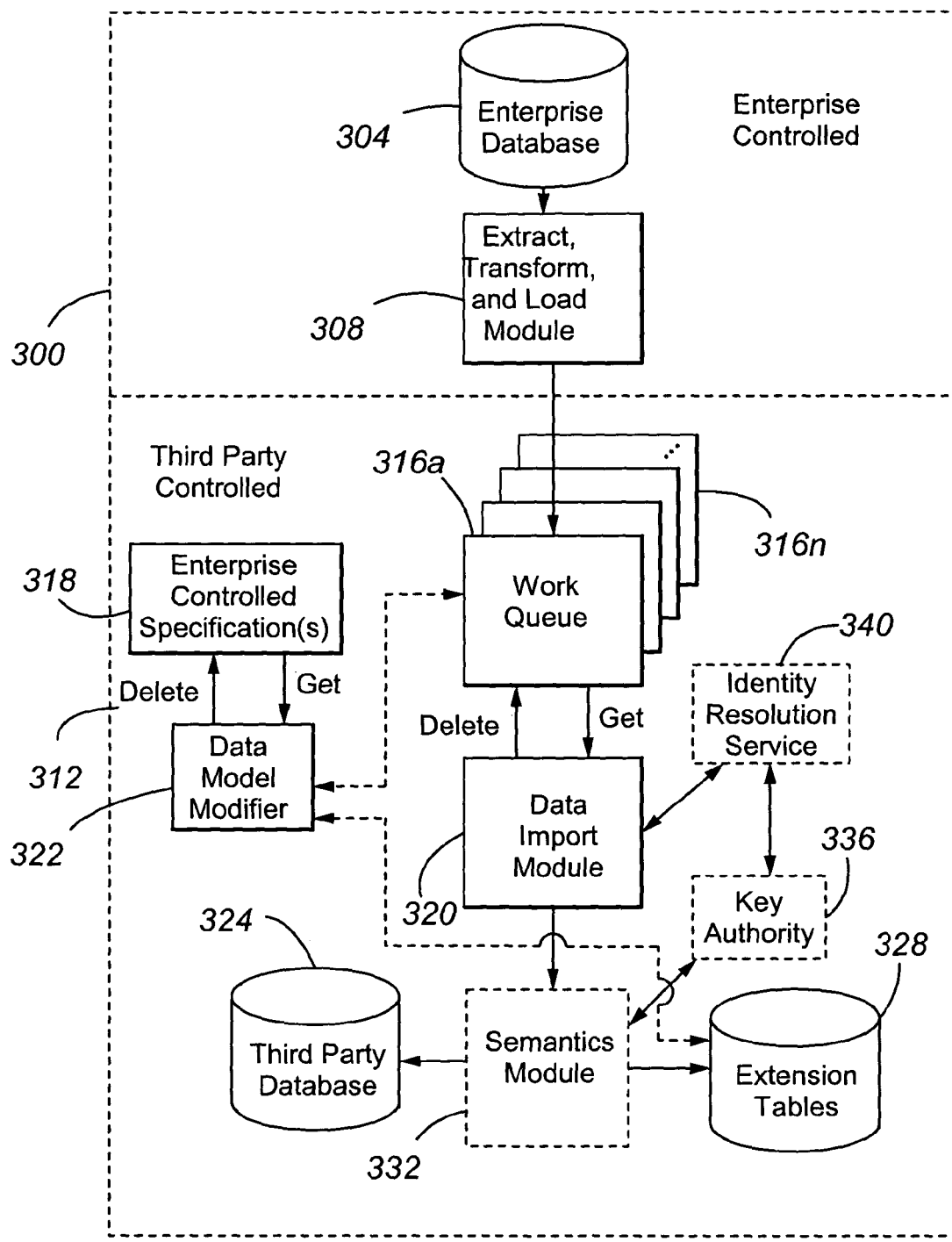
FIG. 3 is a block diagram depicting an embodiment of the event processing module.

FIG. 3 depicts an embodiment of the event processing module 228. The module 228 comprises a first set 300 of devices, namely an enterprise database 304 and an Extract, Transform and Load or ETL module 308, that are controlled by the enterprise and a second set 312 of devices, namely the enterprise-controlled specification(s) 318, data model modifier 322, work queues 316a-n, data import module 320, vendor database 324, extension table 328, semantics module 332, key authority 336, and identity resolution service 340, all of which are controlled by a third party, such as the manufacturer, vendor, or servicing or managing entity of the contact center software. In other words, the enterprise and third party have first and second sets of privileges respecting modification of the contact center database software, with the first set of privileges not including the ability to modify the contact center database software and/or data model and the second set of privileges including that ability. "Modifying the database software and/or data model" includes, for example, the ability to insert, delete and/or update dimensions, keys, or attributes, and rows and/or columns of tables.

The enterprise database 304 and ETL module 308 are conventional. As will be appreciated, the ETL module 308 reads data from its source, cleans it up and formats it uniformly, and then writes it to the target repository, which is depicted as a work queue 316. By way of example, the ETL module 308 performs any key/identifier mapping from external sources to natural keys recognized by the third party controlled system. The ETL module 308 further ensures that the correct data is loaded. This may include performing calculations or other transformations on the data and associating it with the correct entities. Examples of suitable enterprise database 304 software include Oracle™ database products, and Microsoft™ SQL server database products and customer relationship management software by Siebel™ and of suitable ETL modules include ETL systems offered by Microsoft™, Oracle™, IBM™, Ascential Software Corporation™, and Hummingbird Ltd™.

The enterprise controlled specification(s) 318 and data model modifier 322 collectively provide an extensible data model that may be modified by the third party as requested by the enterprise. The specification(s) are preferably an enterprise metadata specification. The specification is an eXtended Markup Language or XML file that defines the tables and columns to be inserted in, deleted from, or updated in the data model. The specification is preferably a set of XML tags and their relationships to one another. The enterprise edits the specification(s) manually and/or via a user interface. The user interface, for example, would ask the user a series of queries regarding the proposed modifications and would write the responses into an XML file in the specification(s). To make this possible, the enterprise, in one configuration, can view (without editing privileges) selected portions of the data model and/or physical tables for the database 324. The data model modifier 322 implements the modification set forth in the specification(s) 318. The data model can be modified by the data modifier 322 in at least the following ways:

1. custom facts can be added to an existing fact table;
2. custom facts can be added to a new table that parallels an existing fact table;
3. custom attributes can be added to an existing dimension table;
4. custom attributes can be added to a new table that parallels an existing dimension table; and
5. custom tables can be added.

With this in mind, the specification(s) typically include specifications regarding the data to be received from the ETL module. Examples of such specifications include dimension identities and relationships to other objects (i.e., dimensions, keys, and attributes) in the data model 324, new rows and column identities and relationships to other objects in the data model, key identities and types and their relationships to other objects in the data model, attribute identities and relationships to other objects in the data model, the identities of columns requiring type 1 or 2 changes, and the like.

When an existing fact or dimension table is extended, the columns specified in the specification(s) are added to the existing table by the modifier 322. This provides for simpler and better performing report queries but may result in wide tables. This approach is, of course, limited if a particular database implementation restricts the number of columns permitted in a table.

To get around wide table restrictions, the data model modifier 322 can create a new table that is parallel to the existing table. The new table contains the custom columns and a key that relates to the existing table. This approach is arbitrarily extensible but requires a join to access the enterprise columns. New tables created through this approach are managed by the third party in the same way as standard tables.

The modifier 322 can also create custom tables managed entirely by the enterprise.

The new tables and enterprise tables are collectively included in the extension tables 328.

For each table with custom columns and for each extension table 328, the modifier 322 creates a corresponding work queue 316a-n. Each work queue contains the custom columns and the natural key and receives data from the ETL module 308 for import into the respective custom column in vendor database 324 and/or into the corresponding custom (extension) table 328. Preferably, the only tables that the enterprise can write to are the work queue tables and any enterprise-controlled custom tables.

The data import module 320 copies the data from the work queues 316a-n to the third party database 324 and extension tables 328, as appropriate. The module 320 acts as an input adapter that translates records in the work queue to normalized events and makes dimension updates as needed. An "event" is an occurrence or happening and a "normalized event" is an expression of an event that is consistent with the data structures in the third party data model. Normalized events are created for each update and injected into the system 312 for processing. For example, the module 320 converts natural keys into entity identifiers, or keys internal to the contact center database 324 using the (optional) Identity Resolution Service (IRS) 340 and key authority 336.

The data import module can convert custom events into normalized events in a variety of ways. For example, an XML schema for custom events can be defined, and a web service published that translates the XML into normalized events. An alternative approach is to implement a custom input translator that receives events from the ETL module 308 and translates them into normalized events. Additionally, a standard event source may have its own customizable event capabilities.

The data import module can be scheduled to run at an enterprise-specified interval (e.g., daily, hourly, every 5 minutes, etc.), invoked manually after the ETL module has run, or invoked by a database trigger.

The identity resolution service 340 maintains a table of entity identifiers, hints, and corresponding natural keys. A "hint" is a form of instruction indicating when a surrogate key is valid for use. Examples of hints include a yes/no flag regarding availability of the surrogate key for current use, a date and/or time after which the surrogate key is valid, a signature indicating that the key is valid, an identified event which must occur before the key is valid, a time stamp (such as of the Entity IDentifier or EID request), the surrogate key itself, a sequence number and the like. In one embodiment, the hint is used by the key authority to map from an EID to a corresponding (valid) surrogate key.

The key authority 336 manages surrogate keys. When an administration change causes a new surrogate key to be generated, the key authority 324 sends the entity identifier to the identity resolution service 340 along with the hint that a new surrogate key is available. The configurations and operations of the IRS 340 and key authority 336 are described in detail in copending U.S. application Ser. No. 11/199,828, filed Aug. 8, 2005, entitled "Deferred Control of Surrogate Key Generation in a Distributed Processing Architecture" to Bland, et al., which is incorporated herein by this reference.

The (optional) semantics module 332 presents an object model for updating dimension and fact data, hides from the enterprise the details of the physical database implementation, including the physical schema, third party database abstraction, and type 2 dimension semantics, manages type 2 dimension semantics (i.e., handles type 2 dimension changes including the generation of surrogate keys), and, in cooperation with the data import module 320, writes dimension and fact data to the databases.

The third party, extension table, and enterprise databases 304, 324, and 328 collectively form the database 114 of FIG. 1. The databases include facts and measures and related semantics regarding a number of enterprise objects, such as customers, agents, contacts or work items, and agent and contact queues 208 and 212.

Figure 4:
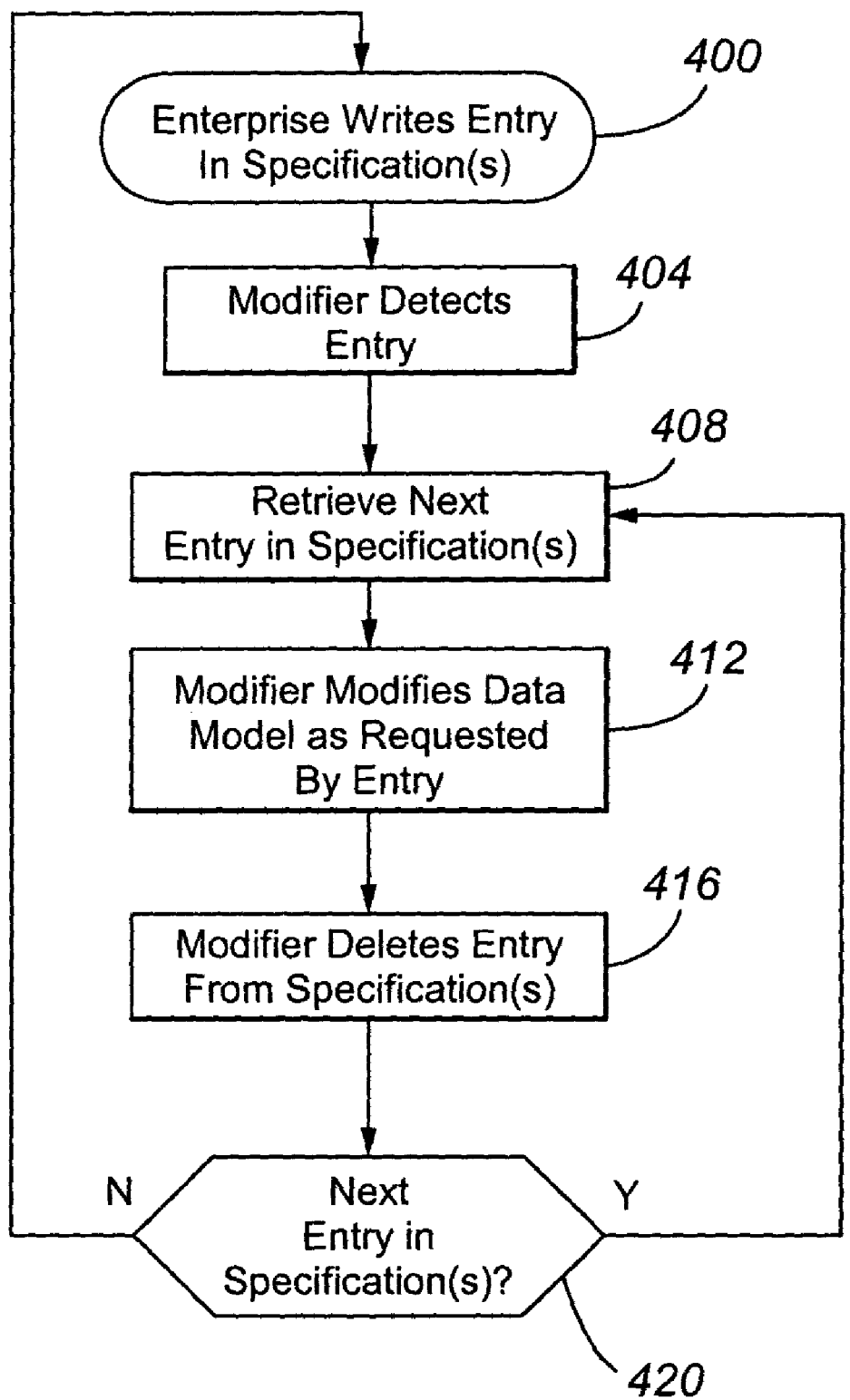
FIG. 4 is a flow chart depicting a first operational embodiment of the event processing module.

The operation of the data model modifier 322 will now be discussed with reference to FIG. 4.

The process is instantiated in step 400 when an entry is written by the enterprise into the specification(s) 318.

In step 404, the modifier 322 detects the entry by a suitable technique. The technique may be, for example, a polling mechanism or by directly launching the modifier 322 after the entry is made.

In step 408, the modifier 322 retrieves a next entry in the specification(s).

In step 412, the modifier 322 modifies the data model as requested by the entry.

In step 416, the modifier 322 deletes the processed entry from the specification(s).

In decision diamond 420, the modifier 322 determines whether there is a next entry in the specification(s). If not, the modifier 322 returns to step 400. If so, the modifier 322 returns to and repeats step 408 with respect to the next entry.

An example will illustrate the operations of the modifier 322. Assume that the enterprise desires to add an agent identifier to the data model because the enterprise has an internal agent identifier for each of its agents in the contact center. The enterprise therefore desires to add to the agent dimension of the third party data model. The enterprise creates an XML specification indicating that a column (or type 2 dimension) called "customer ID" is to be added to the agent dimension table. The type of the column will be called "string". As will be appreciated, other potential types of columns include numeric currency, integer, float and date/time. The XML specification is as follows:

```
<table>
    <name>agent dimension</name>
    <column>
        <colname>customerID</name>
        <coltype>string</coltype>
        <type2dim/>
    </column>
</table>
```

In response, the modifier creates, in the data model, an extension table to the agent dimension table containing the customerID column (as a foreign key in the third party data model for database 324) and adds a work queue table associated with the extension table. After data is written to the work queue for a customer identifier, it is written by the data import module 320 to the corresponding extension table. As will be appreciated, rather than creating a separate extension table the new column could be added directly to the data model for database 324.

Figure 5:
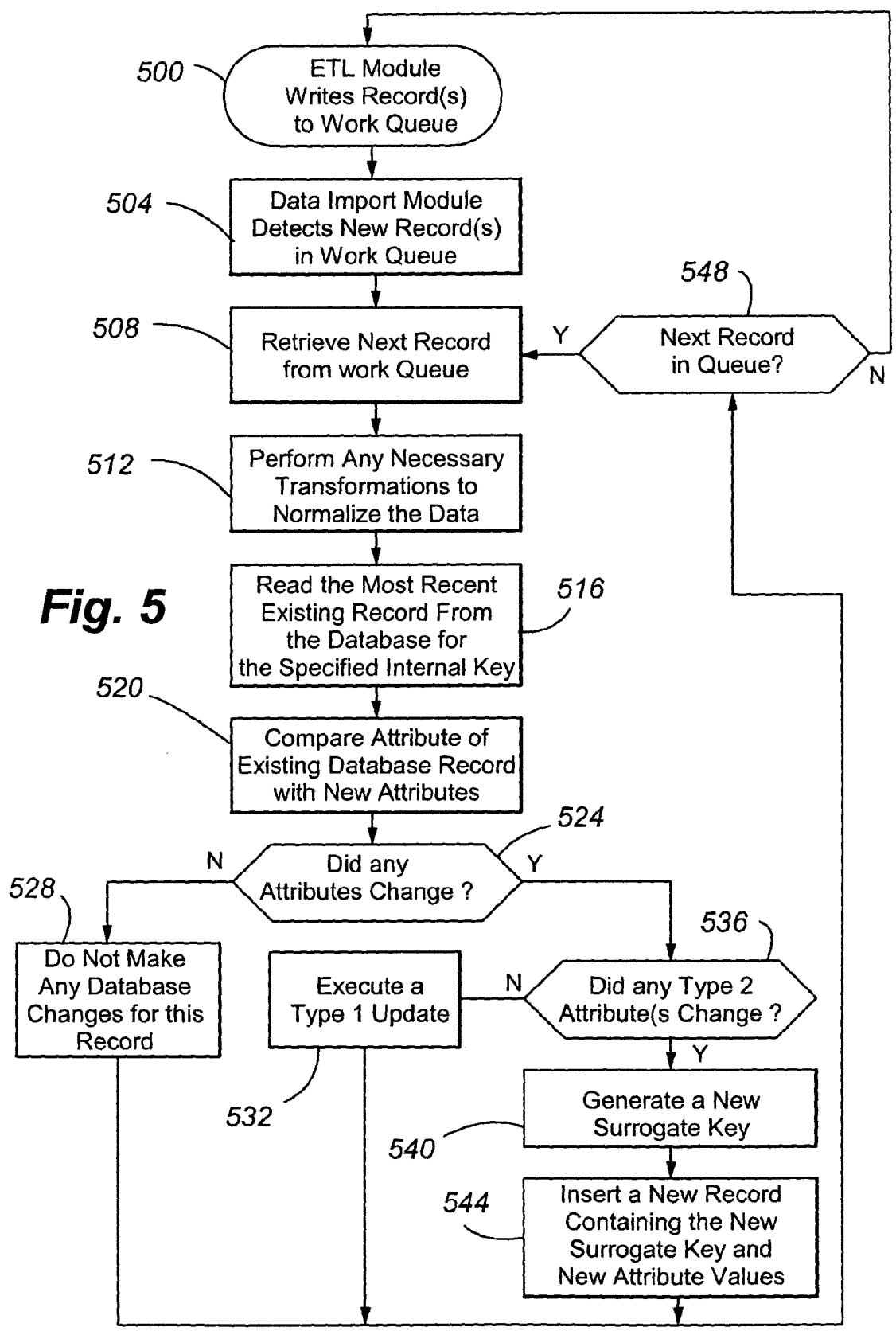
FIG. 5 is a flow chart depicting a second operational embodiment of the event processing module.

The operations of the data import module 320, identity resolution service 340, key authority 336, and semantics module 332 will now be discussed with reference to FIG. 5.

In step 500, the ETL module 320 writes record(s) to one or more work queues (e.g., work queue tables).

In step 504, the data import module 320 detects the new record(s) in the work queue(s). The detection is done by any suitable technique, such as by a polling mechanism (in which the data import module periodically (at defined intervals) polls the work queues for information about unprocessed entries), a database trigger (which fires software in the work queue; that is, database code in the work queues invokes application code when the database code determines that a new row in the work queue table has been written to), or to the enterprise directly launching an import application after the queue table has been written to.

In step 508, the data import module 320 retrieves the next (entered) record from the work queue.

In step 512, the data import module 320 performs any necessary transformations on the retrieved record to normalize the data. For example, enterprise (external) natural keys are converted to database model (internal) keys (such as entity identifiers).

In step 516, the data import module 320 reads the most recent existing record from the database 114 for the specified internal key.

In step 520, the module 320 compares the attributes of the existing database record with the new attributes in the retrieved record.

In decision diamond 524, the module 320 determines whether any attributes have changed. In other words, the module determines whether the attributes in the retrieved record differ from the attributes in the database 114 for specified internal key.

When there is no change, the module 320, in step 528, does not make any change to the database 114 for the retrieved record.

When there is a change, the module 320, in decision diamond 536, determines whether any type 2 attributes has changed.

When no type 2 attribute has changed, the module 320, in step 532, executes a type 1 update. In one configuration, when a type 1 dimension is configured, the entity identifier is used as the key and an update in step 532 affects the existing row in the table.

When a type 2 attribute has changed, the semantics module, in step 540, generates a new surrogate key and, in step 544, the data import module 320 inserts a new record containing the new surrogate key and new attribute value(s).

In one configuration when a type 2 dimension is configured and the update is to a dimension, the modules 320 and 332 select the current dimension data from the database (the selection being based on the entity identifier or use of the key authority 336 to map the entity identifier to a corresponding surrogate key) (step 516); compare the current data to the new data requested for update (if no columns were changed no current update is necessary) (step 520); determine which columns are type 2 (step 536); when all changes are limited to type 1 columns generate an update statement to update the current row in the database (step 532); and if any type 2 column was changed, request a new surrogate key from the key authority (step 540) and generate an insert statement to insert a new row in the database with the new surrogate key (step 544).

If a type 2 column is configured and the update is to a fact, the modules 320 and 322 update the fact by requesting a surrogate key from the key authority using the entity identifier and a hint (as noted the hint informs the key authority which surrogate key applies to the particular fact update and is generated by the IRS, data import module or an event processor and provided to the key authority) (step 540), and generate an appropriate Structured Query Language (SQL) statement to insert or update the fact data using the surrogate key provided by the key authority (step 544).

An illustration of the operation of the data input and semantics modules 320 and 332 will be discussed with reference to the example above. Assume that an agent "Bob Smith" having a natural key "100" in the database 324 has a corresponding customer ID "12345". In the corresponding work queue, the ETL module writes a foreign key, namely "100" (corresponding to the third party's natural key) and the enterprise's corresponding natural key, or customer ID, namely "12345". The data import module detects the entry in the work table and inserts a corresponding record, namely a new instance of "Bob Smith" having a new key "101" because the change is specified as a type 2 change. The record is a new row in the agent dimension table that is identified by the key "101". The entry is then deleted from the table in the work queue.

A number of variations and modifications of the invention can be used. It would be possible to provide for some features of the invention without providing others.

For example in one alternative embodiment, the invention is not limited to type 2 dimensional models but to any dimensional model or other type of relational (nondimensional) database model. The invention is particularly applicable to any application in which there are complicated semantics between the application's data model and the extensions that a customer might want to include. Although type 2 semantics are a good example of such complexity, there could be other applications involving only type 1 dimensional or nondimensional databases having complicated semantics.

In another alternative embodiment, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A data processing system, comprising:
   a first database maintained by a first party;
   a second database maintained by a second party different from and unrelated to the first party, wherein the second party is at least one of a manufacturer or vendor of a software product comprising an extensible data model defining the second database and wherein the first party is a purchaser of the software product;

a work queue operable to specify data to be added to the second database;

an extract, transform, and load module operable to write data from the first database to the work queue;

a data import module operable to import data from the work queue to the second database, wherein the first party is not privileged to write the data directly to the second database, wherein the data in the first database is semantically incompatible with the second database, and wherein the data import module transforms the data written to the work queue to a semantically compatible form for the second database;

a specification to extend a second database maintained by a second party, the specification being provided by the first party and defining tables and columns to be inserted in, deleted from, and/or updated in a data model defining to the second database;

a modifier operable to modify the data model to reflect the specification and to create the work queue corresponding to the modification;

an identity resolution service operable to maintain a table of entity identifiers, hints, and corresponding natural keys, a hint indicating when a surrogate key is valid for use; and a key identifier operable to generate new surrogate keys, send new surrogate keys to the identity resolution service along with a corresponding hint that a new surrogate key is available, and use the hint to map from an entity identifier to a corresponding surrogate key.

2. The system of claim 1, wherein the first party is not privileged to modify directly the semantics of the second database, wherein the first party is not privileged to delete pre-existing data from and update pre-existing data in the second database, and wherein the second party is not privileged to modify directly the semantics of the first database and further comprising:

a modifier to modify the second database as set forth in a set of specifications, wherein the modification comprises at least one of a custom table and a custom column in a table.

3. The system of claim 1, wherein the extract, transform and load module maps keys and/or identifiers from an external source to natural keys recognized by the first database and further comprising:

a semantics module operable to effect updates to type 2 dimension semantics in the second database to accommodate the imported data.

4. The system of claim 3, wherein the work queue comprises a natural key to the first database, the natural key being external to the second database, wherein the semantics module presents an object model for updating dimension and fact data, hides from the first party details of the second database, and, in cooperation with the data import module, writes dimension and fact data to the second database, and wherein the data import module converts the natural key to a key internal to the second database and external to the first database.

5. The system of claim 1 wherein the first party is privileged to view at least selected parts of the second database, wherein the modifier creates a new custom table that is parallel to an existing table in the data model, the custom table containing a custom column and a key that relates to the existing table, wherein, for each existing table with a custom column and for each custom table the modifier creates a corresponding work queue, wherein each work queue comprises at least one custom column and a natural key relating to an existing table and receives data from the extract, transform, and load module for import into a respective custom column in the second database and/or into a corresponding custom table, and wherein the first party is privileged to write data to the work queue.

6. The system of claim 1, wherein the data import module translates data in the work queue to normalized events and makes dimension updates as needed and wherein the modification is at least one of the following:

(i) addition of custom facts to an existing fact table in the second database;

(ii) addition of custom facts to a new table that parallels an existing fact table in the second database;

(iii) addition of custom attributes to existing dimension table in the second database;

(iv) addition of custom attributes to a new table that parallels an existing dimension table in the second database; and (v) addition of a custom table.

7. A method, comprising:

(a) receiving from a first party a set of specifications defining an extension to a second database maintained by a second party;

(b) modifying, by a modifier, the second database as set forth in the set of specifications, wherein the modification comprises an addition of a custom table and further comprising;

(b1) providing a work queue corresponding to the modification;

(b2) receiving, by the work queue, first data from a first database;

(b3) normalizing, by a semantics module, the first data to form second data, wherein the first data is semantically compatible with the first database and semantically incompatible with the second database and wherein the second data is semantically incompatible with the first database and semantically compatible with the second database;

(b4) writing, by a data import module, the second data to the at least one of a custom table, and a custom column in a table;

(b5) maintaining, by an identity resolution service, a table of entity identifiers, hints, and corresponding natural keys, a hint indicating when a surrogate key is valid for use; and (b6) generating, by a key identifier, new surrogate keys;

(b7) sending, by the key identifier, new surrogate keys to the identity resolution service along with a corresponding hint that a new surrogate key is available; and (b8) using the hint to map from an entity identifier to a corresponding surrogate key.

8. The method of claim 7, wherein a work queue is created for each of a plurality of sets of specifications, wherein, in the receiving step, keys and/or identifiers from an external source are mapped to natural keys recognized by the first database.

9. The method of claim 7, wherein the first party is a customer and the second party is at least one of a manufacturer and vendor of a software product comprising an extensible data model defining the second database wherein the first party is a purchaser of the software product, wherein the first party is not privileged to modify directly the semantics of the second database, wherein the first party is not privileged to write directly to the second database, wherein a set of specifications defines at least one of tables and columns to be inserted in, deleted from, and/or updated in a data model defining the second database, and wherein the second party is not privileged to modify directly the semantics of the first database.

10. The method of claim 7, wherein a modifier creates a new custom table that is parallel to an existing table in a data model defining the second database, the custom table containing a custom column and a key that relates to the existing table, wherein, for each existing table with a custom column and for each custom table the modifier creates a corresponding work queue, wherein each work queue comprises at least one custom column and a natural key relating to an existing table and receives data from an extract, transform, and load module for import into a respective custom column in the second database and/or into a corresponding custom table, and wherein the first party is privileged to write data to the work queue and further comprising:
  (g) permitting the first party to view only selected parts of the second database.

11. The method of claim 7, wherein the modification is at least one of the following (i) (iv):
  (i) addition of custom facts to an existing fact table in the second database;
  (ii) addition of custom facts to a new table that parallels an existing fact table in the second database;
  (iii) addition of custom attributes to existing dimension table in the second database; and
  (iv) addition of custom attributes to a new table that parallels an existing dimension table in the second database.

12. The method of claim 11, wherein the at least one of the following (i)-(iv) is (i) addition of custom facts to an existing fact table in the second database.

13. The method of claim 11, wherein the at least one of the following (i)-(iv) is (ii) addition of custom facts to a new table that parallels an existing fact table in the second database.

14. The method of claim 11, wherein the at least one of the following (i)-(iv) is (iii) addition of custom attributes to existing dimension table in the second database.

15. The method of claim 11, wherein the at least one of the following (i)-(iv) is (iv) addition of custom attributes to a new table that parallels an existing dimension table in the second database.

16. The method of claim 7, wherein a semantics module presents an object model for updating dimension and fact data, hides from the first party details of the second database, and, in cooperation with a data import module, writes dimension and fact data to the second database, and further comprising:
  (g) after step (b), deleting the processed set of specifications.

17. The method of claim 7, wherein, in step (b3), the work queue comprises a natural key to the first database, the natural key being external to the second database, and wherein the data import module converts the natural key to a key internal to the second database and external to the first database.

18. The method of claim 7, wherein the writing step comprises:
  (b4a) comparing a first set of attributes in the second database with a corresponding preexisting second set of attributes in the second database;
  (b4b) when the first and second set of attributes are different, determining whether a type 2 attribute has changed;
  (b4c) when a type 2 attribute has not changed, executing a type 1 update to the second database; and
  (b4d) when a type 2 attribute has changed, generating a new surrogate key and inserting into the second database a new record containing the new surrogate key and the first set of attributes.

19. A computer readable medium comprising processor executable instructions stored on a tangible medium, the instructions to perform the following steps:
  (a) receiving from a first party a set of specifications defining an extension to a second database maintained by a second party;
  (b) modifying, by a modifier, a data model defining the second database as set forth in the sets of specifications, wherein the modifications comprise a plurality of the following:
    (b1) addition of custom facts to an existing fact table in the second database;
    (b2) addition of custom facts to a new table that parallels an existing fact table in the second database;
    (b3) addition of custom attributes to existing dimension table in the second database;
    (b4) addition of custom attributes to a new table that parallels an existing dimension table in the second database; and
    (b5) addition of a custom table;
  (c) providing a respective work queue for each of the modifications, each work queue comprising a different key associated with the corresponding modification
  (d) receiving, by a selected work queue, first data from a first database;
  (e) normalizing, by a semantics module, the first data to form second data wherein the second data is associated with a selected key, wherein the first data is semantically compatible with the first database and semantically incompatible with the second database, and wherein the second data is semantically incompatible with the first database and semantically compatible with the second database;
  (f) determining, from the selected key and by a data import module, an existing record in the second database;
  (g) comparing, by the data import module, an attribute of the existing record with an attribute of the second data;
  (h) determining, by the data import module, whether the attribute has changed;
  (i) in response to the determining step (h), applying, by the data import module, the following rules:
    (i1) when there is no attribute change, not making any change to the second database;
    (i2) when there is an attribute change and the changed attribute is a type 2 attribute, generating a surrogate key and corresponding hint for the second data and inserting a new record containing the generated surrogate key and new attribute value into the second database; and
    (i3) when there is an attribute change and the changed attribute is a type 1 attribute, updating an existing row of an existing table.

20. A method, comprising:
  (a) receiving from a first party a plurality of sets of specifications defining an extension to a second database maintained by a second party;
  (b) modifying, by a modifier, a data model defining the second database as set forth in the sets of specifications, wherein the modifications comprise a plurality of the following:
    (b1) addition of custom facts to an existing fact table in the second database;
    (b2) addition of custom facts to a new table that parallels an existing fact table in the second database;
    (b3) addition of custom attributes to existing dimension table in the second database;
    (b4) addition of custom attributes to a new table that parallels an existing dimension table in the second database; and
    (b5) addition of a custom table;

(c) providing a respective work queue for each of the modifications, each work queue comprising a different key associated with the corresponding modification;
(d) receiving, by a selected work queue, first data from a first database;
(e) normalizing, by a semantics module, the first data to form second data wherein the second data is associated with a selected key, wherein the first data is semantically compatible with the first database and semantically incompatible with the second database, and wherein the second data is semantically incompatible with the first database and semantically compatible with the second database;
(f) determining, from the selected key and by a data import module, an existing record in the second database;
(g) comparing, by the data import module, an attribute of the existing record with an attribute of the second data;
(h) determining, by the data import module, whether the attribute has changed;
(i) in response to the determining step (h), applying, by the data import module, the following rules:
  (i1) when there is no attribute change, not making any change to the second database;
  (i2) when there is an attribute change and the changed attribute is a type 2 attribute, generating a surrogate key and corresponding hint for the second data and inserting a new record containing the generated surrogate key and new attribute value into the second database; and
  (i3) when there is an attribute change and the changed attribute is a type 1 attribute, updating an existing row of an existing table.

* * * * *